United States Patent [19]

Sumino et al.

[11] Patent Number: 5,321,104
[45] Date of Patent: Jun. 14, 1994

[54] DEPOSIT SUPPRESSANT COMPOSITION FOR THE INTERNAL SURFACES OF A POLYMERIZATION REACTOR AND A METHOD OF POLYMERIZING VINYL MONOMERS WITH USE OF SAID DEPOSIT SUPPRESSANT COMPOSITION

[75] Inventors: Takeshi Sumino; Tetsuyoshi Yano, both of Niihama; Masayuki Murashige, Funabashi, all of Japan

[73] Assignee: Sumitomo Chemical Co., Ltd., Osaka, Japan

[21] Appl. No.: 5,059

[22] Filed: Jan. 15, 1993

Related U.S. Application Data

[62] Division of Ser. No. 862,362, Apr. 2, 1992, abandoned.

[30] Foreign Application Priority Data

Apr. 11, 1991 [JP] Japan ..................... 3-78737

[51] Int. Cl.$^5$ .................................................. C08F 2/16
[52] U.S. Cl. .......................................... 526/62; 526/74
[58] Field of Search ................................... 526/62, 74

[56] References Cited

U.S. PATENT DOCUMENTS

| | | | |
|---|---|---|---|
| 4,431,783 | 2/1974 | Walker et al. | 526/62 |
| 4,555,555 | 11/1985 | Toyooka et al. | 526/62 |
| 4,933,399 | 6/1990 | Shimizu et al. | 526/62 |
| 5,147,948 | 9/1992 | Masuko et al. | 526/62 |

FOREIGN PATENT DOCUMENTS

| | | |
|---|---|---|
| 027466 | 4/1980 | European Pat. Off. |
| 440952 | 8/1991 | European Pat. Off. |
| 45-30343 | 10/1970 | Japan |
| 62-132907 | 6/1987 | Japan |
| 2363 | 1/1990 | Japan |

OTHER PUBLICATIONS

Hawley's Condensed Chemical Dictionary, 11th Edition, 1987 pp. 302, 855, 938.

*Primary Examiner*—Joseph L. Schofer
*Assistant Examiner*—David Wu
*Attorney, Agent, or Firm*—Birch, Stewart, Kolasch & Birch

[57] ABSTRACT

Disclosed are a deposit suppressant composition for the internal surfaces of a polymerization reactor for polymerizing a vinyl monomer, comprising a naphthol sulfide compound having an average molecular weight of about 500 to 5000, as well as a method of polymerizing a vinyl monomer wherein prior to the polymerization, the deposit suppressant composition is applied to the internal surfaces of a polymerization reactor or added to the reaction system.

9 Claims, No Drawings

DEPOSIT SUPPRESSANT COMPOSITION FOR THE INTERNAL SURFACES OF A POLYMERIZATION REACTOR AND A METHOD OF POLYMERIZING VINYL MONOMERS WITH USE OF SAID DEPOSIT SUPPRESSANT COMPOSITION

This application is a divisional of copending application Ser. No. 07/862,362, filed on Apr. 2, 1992, abandoned, the entire contents of which are hereby incorporated by reference.

FIELD OF THE INVENTION

The present invention relates to a deposit suppressant composition for the internal surfaces of a polymerization reactor for polymerizing vinyl monomers, and a method of polymerizing vinyl monomers with the use of said deposit suppressant composition.

PRIOR ART

A problem with the polymerization of vinyl monomers is a progressive deposit on the internal surfaces of a polymerization reactor, more specifically on the internal wall I5 of the reactor and the surfaces of the impeller, baffles and so on.

The deposit on the internal surface of a polymerization reactor not only detracts from the reactor cooling efficiency, but on detachment and entry of the deposit into product polymers, adversely affects the quality of the product polymers. Furthermore, much labor and time are required for removal of the deposit. Therefore, not a few methods of coating the internal surfaces of a polymerization reactor with a deposit suppressant have heretofore been proposed.

For example, Japanese Examined Patent Publication (Kokoku) No. 30343/1970 teaches the use of polar organic compounds such as thioethers Japanese Examined Patent Publication No. 363/1990 discloses condensates of phenolic compounds with formaldehyde or benzaldehyde Japanese Unexamined Patent Publication (Kokai) No. 34241/1989 (EP0027466) discloses a reaction product of a thiodiphenol and a bleaching agent. U.S. Pat. No. 4,555,555 describes condensates of pyrogallol or hydroxyhydroquinone with aromatic aldehydes U.S. Pat. No. 4,431,783 teaches a 1-naphthol-formaldehyde condensate. Japanese Unexamined Patent Publication (Kokai) No. 132907/1987 teaches polysulfide rubbers.

However, some of these proposed deposit suppressants tend to reduce the polymerization rate or detract from the quality of the product polymers, while others are not sufficient in their suppressant effect, or only effective for a limited time. Thus, all of them remain to be improved.

SUMMARY OF THE INVENTION

The present invention provides a deposit suppressant composition for the internal surfaces of a polymerization reactor for vinyl monomers, which comprises a naphthol sulfide compound having an average molecular weight of about 500 to 5000.

The present invention further provides a method of polymerizing a vinyl monomer wherein the vinyl monomer is polymerized with use of a deposit suppressant composition to prevent the formation of deposits on the internal surfaces of a polymerization reactor, the method being characterized in that a deposit suppressant composition which comprises a naphthol sulfide compound having an average molecular weight of about 500 to 5000 is applied to the internal surfaces of the polymerization reactor, or added to the reaction system prior to the polymerization.

DETAILED DESCRIPTION OF THE INVENTION

The naphthol constituting the naphthol sulfide compound of the invention is a naphthalene which has one or two -OH groups and which may have 1 to 3 substituents such as hydrocarbon groups of 1 to 3 carbon atoms, particularly alkyl groups, halogens, or the like on the aromatic ring thereof. Examples of (i.e. 1,2-naphthalenediol and other isomers), etc.

In the sulfide compound, the average number of the naphthol units is about 4 to 30, preferably about 8 to 15, and the naphthol units may be the same or different.

The number of intervening sulfur atoms between adjacent naphthols is 1 to 8, on the average.

The average molecular weight of the sulfide compound, as determined by gel permeation chromatography (GPC) based on standard polystyrene is about 500 to 5000, preferably about 800 to 3000. The average molecular weight herein is indicated in terms of weight average molecular weight. If the molecular weight is less than the above range, the deposit suppressant effect will not be sufficient, nor will it last long, while an excessive molecular weight tends to make the coating operation difficult.

As an example of the sulfide compound of the invention, 1-naphthol sulfide is a powder having an ocher color and decomposes around 300° C. The sulfide compound is insoluble in water and aliphatic hydrocarbons such as hexane, hardly soluble in methanol and ethanol, and soluble in di($C_1$-$C_4$ alkyl) ketones, tetrahydrofuran and esters of $C_1$-$C_3$ fatty acid with $C_1$-$C_4$ alcohol.

A variety of processes are available for the production of the sulfide compound of the invention. An exemplary process comprises condensing said naphthol with sulfur chloride such as sulfur monochloride or sulfur dichloride.

For this reaction, a naphthol is first dissolved in an organic solvent inert to sulfur chloride. The organic solvent mentioned just above includes aromatic hydrocarbons such as toluene, xylene, chlorobenzene, etc., ethylene dichloride, chloroform, ethyl acetate and so on. Then, sulfur chloride is slowly added to the solution with heating and stirring.

The amount of sulfur chloride to be used is about 0.5 to 2 moles, preferably about 0.9 to 1.2 moles, per mole of the naphthol.

The reaction temperature may range from about 50° C. to 150° C. and the reaction time may generally range from about 0.5 to about 10 hours.

When the reaction is conducted in an open system under atmospheric pressure, the byproduct hydrogen chloride formed with the progress of the reaction may be let off. If the reaction is conducted in a closed system, a suitable hydrochloric acid acceptor such as triethylamine can be employed.

After completion of the reaction, the reaction product, if present in solution, can be recovered by evaporating the solvent. If the reaction product has precipitated out in the reaction mixture, it can be isolated by a solid-liquid separation technique, for example by filtration.

An alternative process for production of the sulfide compound is as follows. First, a naphthol and a small amount of caustic alkali, e.g. NaOH, are heated to give a melt. About 3 g of the caustic alkali per mole of the naphthol is preferably used. To this melt is gradually added sulfur powder. About 25 g of the sulfur powder per mole of the naphthol is preferably used. The temperature is then raised to about 150 to 200° C. The reaction is conducted with the byproduct hydrogen sulfide being constantly removed from the system under atmospheric pressure for several hours, particularly for about one to five hours. The reaction mixture is cooled to room temperature and then dissolved in an organic solvent to be mentioned below. From this solution, the insoluble matter is filtered off, the filtrate is neutralized with a dilute acid such as a dilute sulfuric acid, and the aqueous layer is discarded to obtain the desired product in the form of a solution.

For use as a deposit suppressant composition for the internal surfaces of a polymerization reactor, the sulfide compound is usually used as dissolved in a solvent, i.e., in the form of a solution for coating the internal surfaces of the reactor, though just adding the sulfide compound per se or such solution to the reaction system is also effective.

The solvent mentioned above is preferably a solvent that is capable of dissolving the sulfide compound and can be easily evaporated. Examples of such solvent include various ketones, particularly di($C_1$-$C_4$ alkyl) ketones. e.g. methyl ethyl ketone, methyl isobutyl ketone, etc.; tetrahydrofuran, esters of $C_1$-$C_3$ fatty acid with $C_1$-$C_4$ alcohol, e.g. ethyl acetate, etc. as well as aqueous alkali solutions. Preferable aqueous alkali solutions are, for example, aqueous solutions of alkali metal hydroxide, and the preferred concentrations of such aqueous solutions are about 1 to 10 percent by weight.

The concentration of the sulfide compound in the deposit suppressant solution is not critical so far as the solution is suited for coating purposes, and generally may range from about 0.001 to about 50 g per 100 ml of the solvent.

The use of such a solution of the sulfide compound as a deposit suppressant composition involves no steps other than coating the internal surfaces of the polymerization reactor with the solution.

The term "internal surfaces of a polymerization reactor" used herein is intended to mean all the surfaces that will come into contact with charged monomers, such as the internal surfaces of the reactor body, the surfaces of impeller shaft, blades, baffles, etc. and the inner surfaces of the reflux condenser, conduits and so on. The material or materials constituting such internal surfaces need not be extraordinary but may be any of the industrially conventional materials such as stainless steel, glass, etc.

The method of applying the deposit suppressant solution to the internal surfaces of a polymerization reactor is not critical as long as the surfaces can be adequately coated. Well-known methods can be used, such as brush-coating, spray-coating or filling the reactor with the solution and withdrawing the solution. For commercial large-scale operation, any of the known automatic coating methods as described in Japanese Unexamined Patent Publications No. 61001/1982, No. 36288/1980 and No. 11303/1984, for instance, can be utilized.

The deposit suppressant composition is applied to the internal wall and other parts of a polymerization reactor which will come into contact with charged monomers in an amount of about 0.01 to 10 g/m$^2$ in terms of the sulfide compound. If the amount is less than 0.01 g/m$^2$, the deposit suppressant effect will be inadequate and will not last long. The use of the composition in an amount of more than 10 g/m$^2$ will not achieve further remarkable improvement in the desired effect. When added to the reaction system, the deposit suppressant composition is preferably used in an amount of about 0.01 to 10 g, in terms of the sulfide compound, per square meter of the surfaces on which the deposit formation should be prevented.

The above coating of internal surfaces of the polymerization reactor with the deposit suppressant composition of the invention is performed prior to polymerization of vinyl monomers. In the batch polymerization process, the coating operation can be carried out before every batch reaction but since the deposit suppressant effect of the composition is remarkable, several batch reactions can be consecutively conducted after each coating operation and, after checking for the degree of deposit, another coating procedure can be carried out.

In the case of continuous polymerization, the optimal time for the next coating can be determined by monitoring the degree of the deposit, for example, from heat exchange efficiency.

The addition of the deposit suppressant composition of the invention may also be performed prior to polymerization of vinyl monomers. In the batch polymerization process, the addition of the deposit suppressant composition is conducted before every batch reaction. In the continuous polymerization, the optimal time of the next addition can be suitably determined by monitoring the degree of the deposit.

The polymerization methods to which the deposit suppressant composition of the invention can be applied are suspension polymerization, emulsion polymerization, microsuspension polymerization, solution polymerization, bulk polymerization, gas-phase polymerization and so on, all of which are well known. The effect of the invention is particularly remarkable in suspension, emulsion or microsuspension polymerization in an aqueous medium.

Typical vinyl monomers which can preferably be polymerized in accordance with the invention are vinyl halides such as vinyl chloride; vinyl esters such as vinyl acetate, vinyl propionate, etc., alkyl (meth)acrylates such as methyl methacrylate; esters, particularly lower alkyl esters of unsaturated dibasic acids such as maleic acid, fumaric acid, etc.; diene monomers such as butadiene, chloroprene, isoprene, etc.; styrene, acrylonitrile, vinylidene halides, vinyl ethers and so on.

These monomers can be used alone or in combination where copolymerizable, and may also be used in combination with, inter alia, acrylic acid, methacrylic acid, maleic acid or fumaric acid or the corresponding anhydrides thereof, itaconic acid, acrylamide, methacrylamide, dimethylaminoethyl methacrylate, N-methylolacrylamide, N-methylolmethacrylamide, 2-hydroxyethyl methacrylate, 2-hydroxypropyl acrylate, acrolein, $C_2$-$C_9$ olefins such as ethylene, propylene, and so on.

The deposit suppressant composition of the invention is particularly suited for the suppression of deposit formation in polymerizing vinyl chloride or a vinyl monomer mixture containing vinyl chloride as a major component and other monomer(s) copolymerizable therewith as a minor component. Such mixture preferably contains at least 50 wt %, preferably more than 80 wt % but less than 100 wt %, of vinyl chloride. Examples of other monomers copolymerizable with vinyl chloride are any of the above-exemplified vinyl monomers which are copolymerizable with vinyl chloride, and particularly include vinyl acetate, alkyl (meth)acrylate, especially $C_1$-$C_6$ alkyl (meth)acrylate, and the like. The deposit suppressant composition of the invention is also applicable to graft-copolymerization process wherein vinyl chloride is graft-copolymerized to an ethylene-vinyl acetate copolymer, ethylenealkyl methacrylate copolymer, poly urethane and the like.

In the polymerization method of this invention, the polymerization initiator, the dispersing agent for use in combination with an aqueous medium, etc. may all be well-known conventional reagents, and there is no specific restriction on the polymerization temperature, time and other conditions.

For example, a suspension polymerization of a vinyl monomer can be carried out in a conventional manner in an aqueous medium such as water, using a conventional dispersant (such as partially saponified polyvinyl acetate, carboxymethyl cellulose, gelatin, starch or similar water-soluble macromolecular compounds) and, if desired, an auxiliary dispersion stabilizer (such as barium sulfate or the like) and using a conventional oil-soluble initiator such as benzoyl peroxide, lauroyl peroxide, 2,2'-azobisisobutyronitrile, di-2-ethylhexyl peroxydicarbonate or the like, at a temperature effective to effect the polymerization (usually about 20 to 80° C.) with stirring until the desired polymer is obtained.

Furthermore, the emulsion polymerization is also carried out in a conventional manner in an aqueous medium, such as water, using a conventional emulsifier (such as a salt of a sulfuric acid ester of a higher alcohol, alkylsulfonic acid salts or similar anionic surfactants or polyoxyethylene alkyl ethers or similar nonionic surfactants) and using conventional water-soluble initiators (such as hydrogen peroxide, potassium persulfate, ammonium persulfate or a redox catalyst) at a temperature of about 20° to 80° C., with stirring until the desired polymer is obtained.

The microsuspension polymerization can also be carried out in a conventional manner in an aqueous medium using a conventional emulsifier and an oil-soluble initiator such as those mentioned above. In this case, the reaction system is homogenized prior to the initiation of the polymerization. Then the polymerization is effected at a temperature of, for example, about 20 to 80° C. with stirring until the desired polymer is obtained. Such polymerization method is described, for example, in "Encyclopedia Of pVC", 1976, edited by LEONARD I. NASS, MARCEL DEKKER, INC., New York, pages 88–89.

The foregoing polymerization methods over se are all well-known and conventional, and described in many publications such as "Encyclopedia of PVC" 1976, edited by LEONARD I. NASS, MARCEL DEKKER, INC., New York, pp. 76-89, U.S. Pat. No. 4,555,555 and the like, and the polymerization methods can be easily carried out by one skilled in the art.

The naphthol sulfide compound of the invention exhibits a very remarkable deposit suppressant effect when applied to the internal surfaces of a polymerization reactor for vinyl monomers. It is particularly suited for the polymerization of vinyl chloride monomers in an aqueous medium. When the reactor body, impeller blades and so on are made of stainless steel, the surfaces thereof are generally finished mirror-smooth by electrolytic polishing to prevent deposit formation. The sulfide compounds of the invention adhere well to such surfaces and exhibit the deposit suppressant effect for a long period of time.

The following examples are intended to illustrate the invention in further detail and should by no means be construed to limit the scope of the invention.

EXAMPLE 1

A three-necked flask equipped with a reflux condenser and a stirrer was charged with 1 kg (6.9 moles) of 1-naphthol-and 5 l of toluene and heated with stirring to a temperature at which reflux of toluene took place. Then, 620 ml (6.9 moles) of sulfur monochloride was added dropwise at the same temperature as mentioned above over a period of 6 hours and the reaction mixture thus obtained was maintained at the same temperature for one hour.

After cooling the reaction mixture to 30° C., 3 l of hexane was added with stirring so that 1-naphthol sulfide was precipitated.

The solid phase of the precipitated 1-naphthol sulfide was isolated by a solid-liquid separation technique to give 1.3 kg of 1-naphthol sulfide as a solid.

The molecular weight of the sulfide compound as determined by GPC (gel permeation chromatography) was 1040 based on standard polystyrene. In the sulfide compound, the average number of 1-naphthol units is estimated to be about 5, and the average number of intervening sulfur atoms between the adjacent 1-naphthol units is estimated to be about 2.

The sulfide compound was a powder having an ocher color, and decomposed around 300° C. The sulfide compound was insoluble in water and aliphatic hydrocarbons such as hexane, hardly solute in methanol and ethanol, and soluble in di($C_1$-$C_4$ alkyl) ketones, tetrahydrofuran and esters of $C_1$-$C_3$ fatty acid with $C_1$-$C_4$ alcohol.

The obtained sulfide compound was dissolved in tetrahydrofuran to give a deposit suppressant solution containing the sulfide compound in an amount of 0.1 g per 100 ml of the solvent.

EXAMPLE 2

The internal wall and other parts of a glass-lined polymerization reactor of 100-liter capacity which were to be exposed to monomer charge were spray-coated with the above deposit suppressant solution in an amount of 0.1 g/m$^2$, calculated as solids, to form a coating film.

After the atmosphere was purged, the polymerization reactor was charged with 40 kg of deionized water, 25 kg of vinyl chloride, 150 g of sodium lauryl sulfate, 100 g of stearyl alcohol and 4.0 g of di-2-ethylhexyl peroxydicarbonate.

After homogenization, the charge was heated to 53° C. to initiate polymerization. When the pressure had fallen by 0.5 kg/cm$^2$, unreacted monomer was removed to terminate the reaction. Then the liquid contents of the reactor were withdrawn.

After gently rinsing the internal surfaces of the polymerization reactor with water, the deposits were scraped off from the internal surface, and the amount of the deposits was measured. The amount of the deposits was 65 g/m$^2$.

COMPARISON EXAMPLE 1

Polymerization of vinyl chloride was carried out in the same manner as in Example 2 except that the internal surfaces of the reactor were not coated with the deposit suppressant solution.

The amount of the deposits on the internal surface was 1,100 g/m$^2$.

EXAMPLE 3

The procedure of Example 2 was repeated except that 8 g of di-2-ethylhexyl peroxydicarbonate and a polymerization reactor made of electrolytically polished stainless steel and having 100-liter capacity were used and that the polymerization temperature was 49° C.

The amount of the deposits on the internal surface was 11 g/m$^2$.

COMPARISON EXAMPLE 2

The procedure of Example 3 was repeated except that the internal surfaces of the reactor were not coated with the deposit suppressant solution.

The amount of the polymer deposits on the internal surface was 600 g/m$^2$.

EXAMPLE 4

The internal surface and other parts of a glass-lined polymerization reactor of 100-liter capacity which were to be exposed to charged monomer were spray-coated with the deposit suppressant solution obtained in Example 1 in an amount of 0.15 g/m$^2$ calculated as solids to form a coating film.

This polymerization reactor was charged with 31 kg of deionized water, 30 g of partially saponified polyvinyl acetate with a saponification degree of 80 % and a viscosity of 48 cps (4% in water, at 20° C.), 10.5 g of partially saponified polyvinyl acetate with a saponification degree of 35% and a viscosity of 10 cps (4% in water, at 20° C.) and 21.4 g of di-2-ethylhexyl peroxydicarbonate. After purging, the reactor was charged with 30 kg of vinyl chloride monomer. The polymerization was conducted with stirring at 57° C.

When the internal pressure of the reactor had fallen to 7.5 kg/cm$^2$, unreacted monomer was removed to terminate the reaction. Then the contents of the reactor were withdrawn.

There was no deposit on the internal surface of the polymerization reactor which had been exposed to the monomer charge. Similarly, there was no deposit on the surfaces which had been exposed to the gas phase.

COMPARISON EXAMPLE 3

Polymerization of vinyl chloride was carried out in the same manner as in Example 4 except that the internal surfaces of the reactor were not coated with the deposit suppressant solution.

After termination of the reaction, the contents were withdrawn. After the internal surfaces of the polymerization reactor were gently rinsed with water, the deposits were scraped off from the internal surface, and the amount of the deposits was determined. The amount of the deposits was 160 g/m$^2$.

EXAMPLE 5

A glass-lined polymerization reactor of 100-liter capacity was evacuated to remove air, and then charged with 40 kg of deionized water, 25 kg of vinyl chloride, 150 g of sodium lauryl sulfate, 100 g of stearyl alcohol, 4.0 g of di-2ethylhexyl peroxydicarbonate and 150 ml of the deposit suppressant solution obtained in Example 1.

After homogenization, the charge was heated to 53° C. to initiate polymerization. When the pressure had fallen by 0.5 kg/cm$^2$, unreacted monomer was removed to terminate the reaction. Then the liquid contents of the reactor were withdrawn.

After the internal surfaces of the polymerization reactor were gently rinsed with water, the deposits on the internal wall were scrapped off and the amount thereof was determined. The amount of the deposits was 10 g/m$^2$.

We claim:

1. A method of polymerizing a vinyl monomer comprising preventing the formation of deposit on the internal surfaces of a polymerization reactor by polymerizing vinyl monomer in the presence of a deposit suppressant composition which comprises a naphthol sulfide oligomer or polymer having a weight average molecular weight of about 500 to 5,000, wherein said deposit suppressant is applied to the internal surfaces of a polymerization reactor or added to the reaction system prior to the polymerization.

2. The method according to claim 1, wherein said naphthol sulfide oligomer or polymer has a weight average molecular weight of about 800 to 3000.

3. The method according to claim 1 wherein the naphthol is a naphthalene which has one or two —OH groups and which may have 1 to 3 substituents selected from the group consisting of hydrocarbon group of 1 to 3 carbon atoms and halogen atom on the aromatic ring thereof.

4. The method according to claim 1 wherein the naphthol is at least one member selected from the group consisting of 1-naphthol, 2-naphthol and naphthalenediols 5. The method according to claim 1 wherein the naphthol sulfide oligomer or polymer is a reaction product of a naphthol with a sulfur chloride.

6. The method according to claim 1 wherein the vinyl monomer is vinyl chloride or a monomer mixture containing vinyl chloride as a major component and one or more vinyl monomers copolymerizable therewith as a minor component.

7. The method according to claim 1 wherein the deposit suppressant composition is in the form of a solution of the naphthol sulfide oligomer or polymer in at least one solvent selected from the group consisting of di($C_1$-$C_4$ alkyl) ketones, tetrahydrofuran, esters of $C_1$-$C_3$ fatty acid with $C_1$-$C_4$ alcohol and an aqueous alkali solution.

8. The method according to claim 7 wherein the deposit suppressant composition contains the naphthol sulfide oligomer or polymer in an amount of about 0.001 to 50 g per 100 ml of the solvent.

9. The method according to claim 7 wherein the deposit suppressant composition is applied to the internal surfaces of the polymerization reactor in an amount of about 0.01 to 10 g/m$^2$ in terms of the naphthol sulfide oligomer or polymer.

* * * * *